United States Patent [19]

Melocik et al.

[11] Patent Number: 4,521,885
[45] Date of Patent: Jun. 4, 1985

[54] DIAGNOSTIC DISPLAY APPARATUS

[75] Inventors: Grant C. Melocik, Chardon; William Pickering, University Heights, both of Ohio

[73] Assignee: Towmotor Corporation, Mentor, Ohio

[21] Appl. No.: 455,721

[22] Filed: Jan. 5, 1983

[51] Int. Cl.³ .................. G08B 21/00; G06F 11/32
[52] U.S. Cl. .................. 371/29; 340/52 F; 364/551
[58] Field of Search .............. 371/29, 20; 364/551, 364/424; 340/52 F

[56] References Cited

U.S. PATENT DOCUMENTS

| | | | |
|---|---|---|---|
| 3,939,453 | 2/1976 | Schroeder | 371/29 X |
| 3,964,018 | 6/1976 | Strait et al. | 340/52 F |
| 4,034,194 | 7/1977 | Thomas et al. | 371/29 X |
| 4,158,431 | 6/1979 | Van Bavel et al. | 371/20 |
| 4,245,309 | 1/1981 | Kiefer | 371/20 X |
| 4,275,464 | 6/1981 | Schmidt | 371/29 X |
| 4,277,833 | 7/1981 | Steffen | 371/29 X |
| 4,307,374 | 12/1981 | Bode et al. | 340/52 F |
| 4,376,298 | 3/1983 | Sokol et al. | 340/52 F |
| 4,438,422 | 3/1984 | Nojiri et al. | 340/52 F |

OTHER PUBLICATIONS

Applications filed simultaneously herewith by: Grant C. Melocik et al. for: Anti-Rollback Control; Dual-Motor Control Apparatus; Coil and Coil Driver Control Apparatus; Motor Speed Control Apparatus; Short Circuit Protection Apparatus; Plugging Electrical Braking Control Circuit; and Current Limit Control Circuit.

Primary Examiner—Charles E. Atkinson
Attorney, Agent, or Firm—Stephen L. Noe

[57] ABSTRACT

The invention pertains to an apparatus (10) for diagnosing and displaying the condition of various components in an electro-mechanical vehicle or other system. The apparatus (10) includes command signal producing devices (12), control signal receiving devices (14), and means (16) for delivering control signals to the receiving devices (14) in response to receiving the produced command signals. The means (16) includes means (128) for receiving diagnostic command signals and displaying a predetermined diagnostic code in response to receiving a predetermined command signal. Both in-service and out-of-service diagnostics are provided for and a minimum of equipment external to the apparatus (10) is required, thus making the system both efficient and low in cost.

9 Claims, 4 Drawing Figures

FIG. 1

DIAGNOSTIC DISPLAY APPARATUS

DESCRIPTION

1. Technical Field

The present invention relates generally to circuit testing apparatus and, more particularly, to diagnostic display apparatus.

2. Background Art

In many electro-mechanical systems it is important for operating personnel to have information concerning the condition of the system, both prior to and during operation. In a typical electro-mechanical system, for example an electric vehicle or lift truck, there are numerous input and output devices which must be maintained in good order for the proper operation of the truck. These include various switches and sensors for direction selection, accelerator position, steering angle, etc., and contactors and relays for controlling motors and the like. The failure of one or more of these devices can render the truck inoperative or reduce its efficiency. In addition, some elements of such a system are desirably monitored substantially continuously, for example the state of charge of the vehicle battery.

Previous systems separate the in-service monitoring of, for example, battery condition, from the out-of-service diagnostic or maintenance checking. In-service monitoring is performed with various meters and gauges placed in the view of the vehicle operator, and, in the most rudimentary and common systems, out-of-service diagnostic checking consists of component level testing performed by a skilled mechanic or serviceman.

One problem with such prior systems is that a multitude of various test equipment is required to perform the disparite tests. Another problem is that a skilled serviceman is required to make the out-of-service tests and properly evaluate the results of the tests. Delays in obtaining such skilled service, or in locating the proper test equipment, are translated directly into lost system operating time and result in increased operating costs. In addition, the same equipment does not serve for both in-service and out-of-service testing, necessitating increased expenditures for the multiplicity of equipment.

The costs associated with maintaining a staff of highly trained and skilled servicemen and with purchasing expensive and duplicative service equipment, along with the ever increasing complexity of modern electro-mechanical systems and the vulnerability of such systems to failure owing to such increased complexity, demands an innovative approach to the subject of system diagnostics.

The present invention is directed to overcoming one or more of the problems as set forth above.

DISCLOSURE OF THE INVENTION

In one aspect of the present invention, a vehicle has a plurality of command signal producing devices, a plurality of control signal receiving devices, and means for controllably delivering control signals to the signal receiving devices in response to receiving the produced command signals. The improvement comprises means for receiving diagnostic command signals and means for displaying a predetermined diagnostic code in response to receiving a predetermined command signal.

Prior diagnostic equipment and procedures are not readily adaptable to both in-service and out-of-service use, require skilled personnel, and are expensive, complex, and time-consuming. The present invention utilizes modern technology to simplify both in-service and out-of-service testing using a minimum of equipment external to the system being tested.

BRIEF DESCRIPTION OF THE DRAWINGS

For a better understanding of the present invention, reference may be had to the accompanying drawings in which:

FIG. 1 is a schematic diagram of an embodiment of the diagnostic display apparatus; and, FIG. 2, comprised of FIGS. 2A, 2B and 2C, is a flowchart of software used in the embodiment of FIG. 1.

BEST MODE FOR CARRYING OUT THE INVENTION

Figure 1:
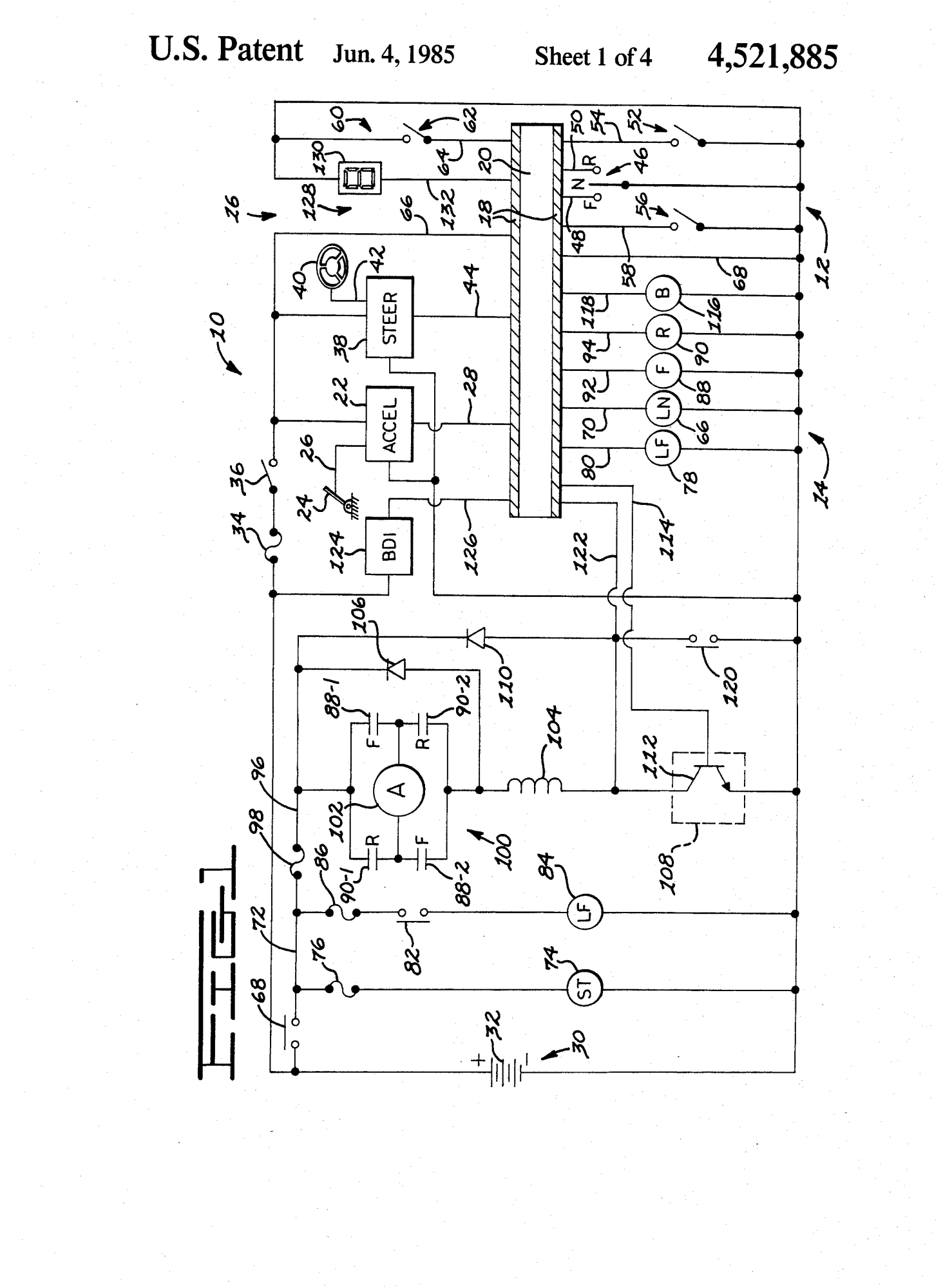
Figure 2A:
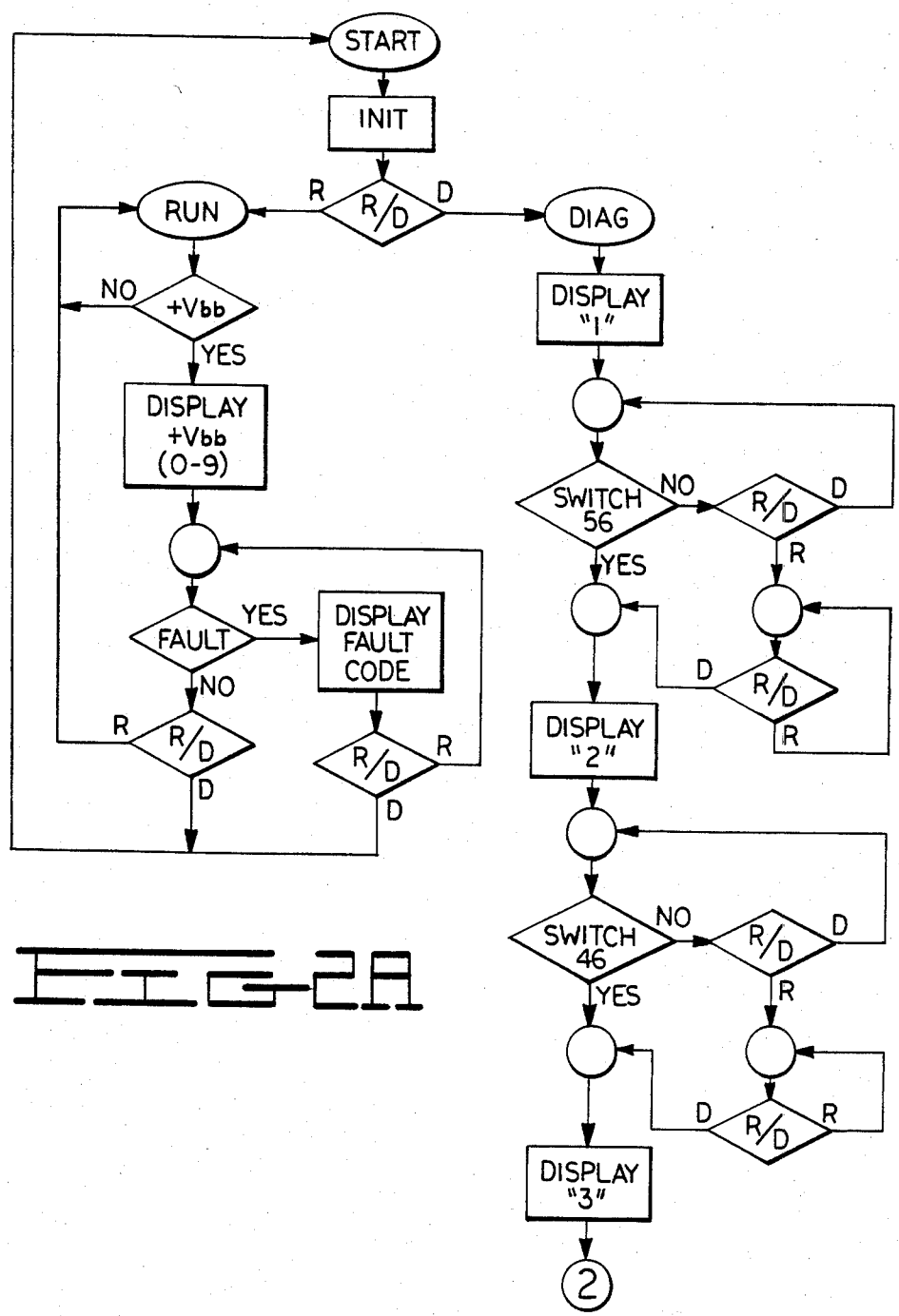

FIG. 1 shows an apparatus 10 having a plurality of command signal producing devices 12, a plurality of control signal receiving devices 14, and means 16 for controllably delivering control signals to the signal receiving devices 14 in response to receiving command signals from the signal producing devices 12. The apparatus 10 is, for example, an electro-mechanical system such as an electric lift truck.

The means 16 includes interface circuitry 18 and a software programmable processor 20. The interface circuitry 18 consists of resistors and other miscellaneous components (not shown) for conditioning signals entering and exiting a processor, as is well known in the art. The software programmable processor is, for example, a microprocessor (20) such as the part number 3870 manufactured by MOSTEK Corporation of Carrollton, Tex.

The command signal producing devices 12 include various devices for supplying command signals to the means 16 with said command signals indicating a desired mode of apparatus 10 operation. Continuing the electric vehicle example, an accelerator means 22 supplies digitized information to the means 16 in response to an accelerator pedal 24 position. The pedal 24 position is supplied to the means 22 via a linkage 26. The means 22 is connected between $+Vcc$ and $-Vcc$ and delivers digital accelerator command signals to the means 16 via a set of lines 28. The voltage Vcc is supplied from a power source 30 such as a battery 32 through a fuse 34 and a switch 36. The switch 36 is preferably of the key operated variety.

The digital signals supplied by the means 22 are preferably a plurality of 4-bit signals or numbers ranging from 0000 to 1111. Each number in the range 0000–1111 represents a different pedal 24 position. For example, in response to the accelerator pedal 24 being fully released, the means 22 delivers the digital number 0000 on the lines 28. In response to the pedal 24 being fully depressed, the means 22 delivers the number 1111 on the lines 28. In response to the plurality of pedal 24 positions between the fully released and fully depressed positions, the means 22 delivers predetermined ones of the plurality of numbers between 0000 and 1111 on the lines 28.

In a manner similar to the means 22, a steer-wheel angle means 38 supplies digitized information to the means 16 in response to a steerable wheel 40 position. The steerable wheel 40 position is supplied to the means 38 via a linkage 42. The means 38 is connected between $+Vcc$ and $-Vcc$ and delivers digital steering command signals to the means 16 via a set of lines 44.

The digital signals supplied by the means 38 are preferably a plurality of 4-bit signals or numbers ranging from 0000 to 1111. Each number in the range 0000–1111 represents a different steerable wheel 40 angular position. For example, in response to the steerable wheel 40 being positioned in a first maximum angular position to turn the vehicle in a first direction, the means 38 delivers the digital number 0000 on the lines 44. In response to the steerable wheel 40 being positioned in a second maximum angular position to turn the vehicle in a second direction, the means 38 delivers the digital number 1111 on the lines 44. In response to the plurality of steerable wheel positions between the first and second maximum angular positions, the means 38 delivers predetermined ones of the plurality of numbers between 0000 and 1111 on the lines 44.

The range of digital numbers from 0000 to 1111, in the binary coded decimal format, is used only for convenient illustration and can be other suitably coded digital representations having a number of bits consistent with the desired precision, for example, a gray code. In addition, the progression from 0000 to 1111 can be linear or non-linear as desired. A non-linear progression provides increased resolution in a predetermined portion of the pedal 24 and/or steerable wheel 40 travel for increased operator convenience and control.

A direction switch 46, having forward F, reverse R, and neutral N positions, supplies direction command signals to the means 16, through the interface circuitry 18, in response to the switch 46 position. The switch 46 is connected to −Vcc and delivers forward and reverse direction command signals to the interface circuitry 18 via respective lines 48,50. The neutral switch 46 position is denoted by the absence of forward and reverse command signals on the lines 48,50.

In a like manner, a lift switch 52 supplies carriage lift command signals to the means 16, through the interface circuitry 18, in response to the position of the switch 52. The switch 52 is connected to −Vcc and delivers lift command signals to the interface circuitry 18 via a line 54. A seat switch 56 supplies a signal to the means 16, through the interface circuitry 18, in response to a predetermined movement of the vehicle seat, for example, in response to an operator being seated in an operating position on the seat. The switch 56 is connected to −Vcc and delivers signals to the interface circuitry 18 via a line 58.

The command signal producing devices 12 also include a means 60 for producing first and second diagnostic command signals. The means 60 includes a RUN/DIAGNOSTIC switch 62 for supplying the first and second diagnostic command signals to the means 16, through the interface circuitry 18, in response to the position of the switch 62. The switch 62 is connected to −Vcc and delivers the first and second signals to the interface circuitry 18 via a line 64.

The means 16, including the interface circuitry 18 and the processor 20, is connected between +Vcc and −Vcc via respective lines 66,68 and is powered by the power supply 30.

The command signal receiving devices 14 include various devices for receiving command signals from the means 16 in response to a desired mode of apparatus 10 operation. In the electric vehicle example, the devices 14 include a line contactor coil 66 having an associated contact 68. A first end of the coil 66 is connected to the interface circuitry 18 via a line 70 and a second end is connected to −Vcc. The coil 66 controls the contact 68 in response to control signals from the means 16 which are delivered through the interface circuitry 18 via the line 70. The means 16 supplies the signal to energize the coil 66 and close the contact 68 in response, for example, to receiving the command signal from the seat switch 56. The line contact 68 supplies or blocks +Vbb power from the power supply 30 to a line 72 in response to the contact's 68 controlled opened or closed status.

The line 72 delivers +Vbb to various circuits of the apparatus 10. For example, a power steering pump motor 74, in series with a fuse 76, is connected between a line 72 and −Vcc. In response to the contact 68 being opened and closed, the motor 74 is respectively turned "on" and "off". Regardless of the status of the contact 68, however, power continues to be supplied to the means 16 via the fuse 34 and the switch 36.

A lift contactor coil 78 has a first end connected to the interface 18 via a line 80 and a second end connected to −Vcc. The coil 78 controls an associated contact 82 in a manner analogous to that described for the line contactor coil 66 and contact 68. A lift pump motor 84 is connected between a first end of the contact 82 and −Vcc. A second end of the contact 82 is connected through a fuse 86 to the line 72. The means 16 supplies the signal to energize the coil 78 and close the contact 82 in response to receiving the command signal from the lift switch 52. In response to the contact 82 being opened and closed and to the line contact 68 being closed, the motor 84 is respectively turned "on" and "off".

Forward and reverse direction contactor coils 88,90 and associated forward and reverse direction contacts 88-1,88-2,90-1,90-2 are controllably operated in response to the direction control signals produced by the means 16. The coils 88,90 each have a first end connected to the interface circuitry 18 by respective lines 92,94 and a second end connected to −Vcc.

In response to the direction switch 46 being in the forward F position, the means 16 delivers the signals to energize the coil 88 and close the associated contacts 88-1,88-2, and de-energize the coil 90 and open the associated contacts 90-1,90-2. In response to the direction switch 46 being in the reverse R position, the means 16 delivers the signals to energize the coil 90 and close the associated contacts 90-1,90-2, and de-energize the coil 88 and open the associated contacts 88-1,88-2. Finally, in response to the direction switch 46 being in the neutral N position, the means 16 delivers the signals to de-energize both of the coils 88,90 and return the contacts 88-1,88-2,90-1,90-2 to the open state as shown in FIG. 1.

First ends of the contacts 88-1,90-1 are connected to a line 96. The line 96 is connected through a fuse 98 to the line 72 and to the means 16. Second ends of the contacts 88-1,90-1 are connected respectively to first ends of the contacts 88-2,90-2. A drive motor 100 has a first end of an armature 102 connected to the juncture of the contacts 88-1,90-1 and a second end of the armature 102 connected to the juncture of the contacts 88-2,90-2. Second ends of the contacts 88-2,90-2 are connected to a first end of a drive motor field 104 and to the anode of a plug diode 106. The cathode of the diode 106 is connected to the line 96. A second end of the field 104 is connected through a controllable supplying means 108 to −Vcc. The second end of the field 104 is also connected to the anode of a flyback diode 110. The cathode of the diode 110 is connected to the line 96.

The means 108 includes a transistor 112 having a collector connected to the second end of the field 104, an emitter connected to −Vcc, and a base connected to the interface circuitry 18 via a line 114. In response to receiving command signals from the accelerator means 22, the means 16 delivers motor control signals to the supplying means 108. In response to receiving the control signals from the means 16, the means 108 controllably opens and closes the current path from the second end of the field 104 to −Vcc. The control signals delivered to the means 108 are typically pulse trains having variable duty factors. The duty factors vary, i.e., the percentage of "on-time" relative to "off-time" varies, in response to the digital number delivered to the means 16 by the means 22.

In response to the direction switch 46 being in the neutral N position, the motor 100 is disabled because all of the contacts 88-1,88-2,90-1,90-2 are open. In response to the switch 46 being in the forward F position and to the line contact 68 being closed, a current path is completed from +Vbb, through the contact 68, the fuse 98, the contact 88-1, the armature 102, the contact 88-2, the field 104 and the means 108 to −Vcc. The motor 100 is responsively rotated to drive the vehicle in the forward direction at a speed responsive to the duty factor of the pulse trains delivered to the supplying means 108. Reverse operation, in response to the switch 46 being moved to the reverse R position, is the same as that just described for forward operation except that the contacts 88-1,88-2 are opened and the contacts 90-1,90-2 are closed, reversing the flow of current through the armature 102. The functioning of the plug diode 106 and the flyback diode 110 is as conventional in the motor drive art.

A bypass contactor coil 116 has a first end connected via a line 118 to the interface circuitry 18 and a second end connected to −Vcc. An associated bypass contact 120 is connected in parallel with the supplying means 108. The junction of the contact 120, means 108, field 104, and diode 110 is connected via a line 122 to the means 16. In response to receiving a maximum speed command signal from the means 22, the means 16 delivers the signal to energize the coil 116 and close the contact 120. Closing the contact 120 effectively bypasses the controllable supplying means 108 and completes the current path through the motor 100 for maximum motor speed operation.

A transducer means 124 is connected between +Vbb and the interface circuitry 18. The means 124 receives the battery voltage +Vbb, produces digital signals in response to the received voltage, and delivers the digital signals to the means 16 via lines 126 connected to the interface circuit 18.

The means 16 also includes means 128 for displaying a predetermined diagnostic code in response to receiving one of the first and second diagnostic command signals, automatically incrementing the displayed code in response to receiving a predetermined command signal, and inhibiting the automatic incrementing of the displayed code in response to being free from receiving the predetermined command signal. In response to receiving the other of the first and second diagnostic command signals, the means 128 substantially continuously displays a predetermined condition of the battery 32, for example, the state of charge or voltage of the battery 32.

The means 128 includes, for example, a single seven segment digital display device 130 connected to the interface circuitry 18 via lines 132 and to −Vcc. The device 130 displays various alpha-numeric characters in response to receiving signals delivered over the lines 132 by the means 16. Each alpha-numeric character displayed represents one of the predetermined diagnostic codes. As described above, the means 128 functions in a plurality of modes determined by the position of the RUN/DIAGNOSTIC switch 62 and the software program of the processor 20.

Figure 2B:
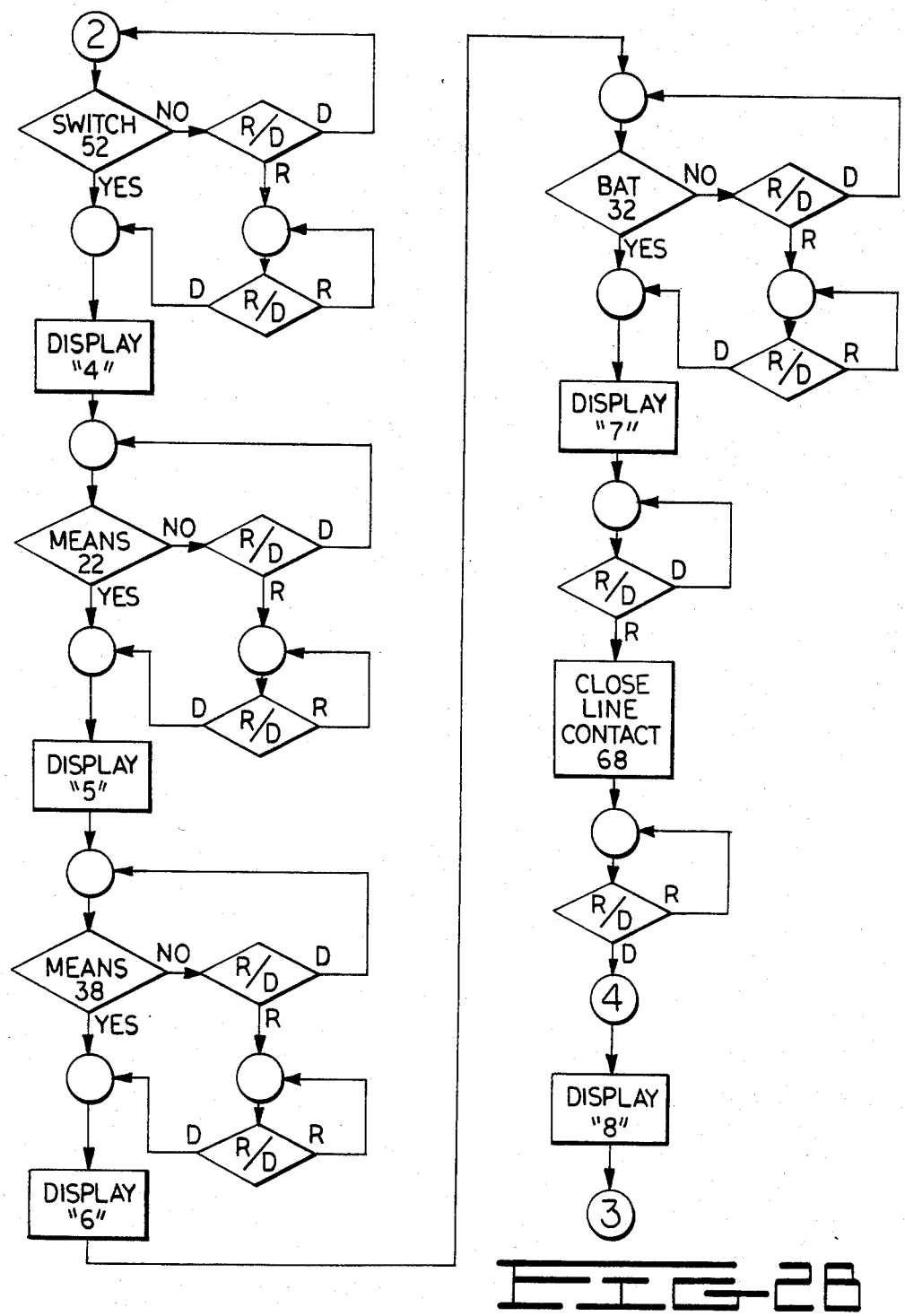
Figure 2C:
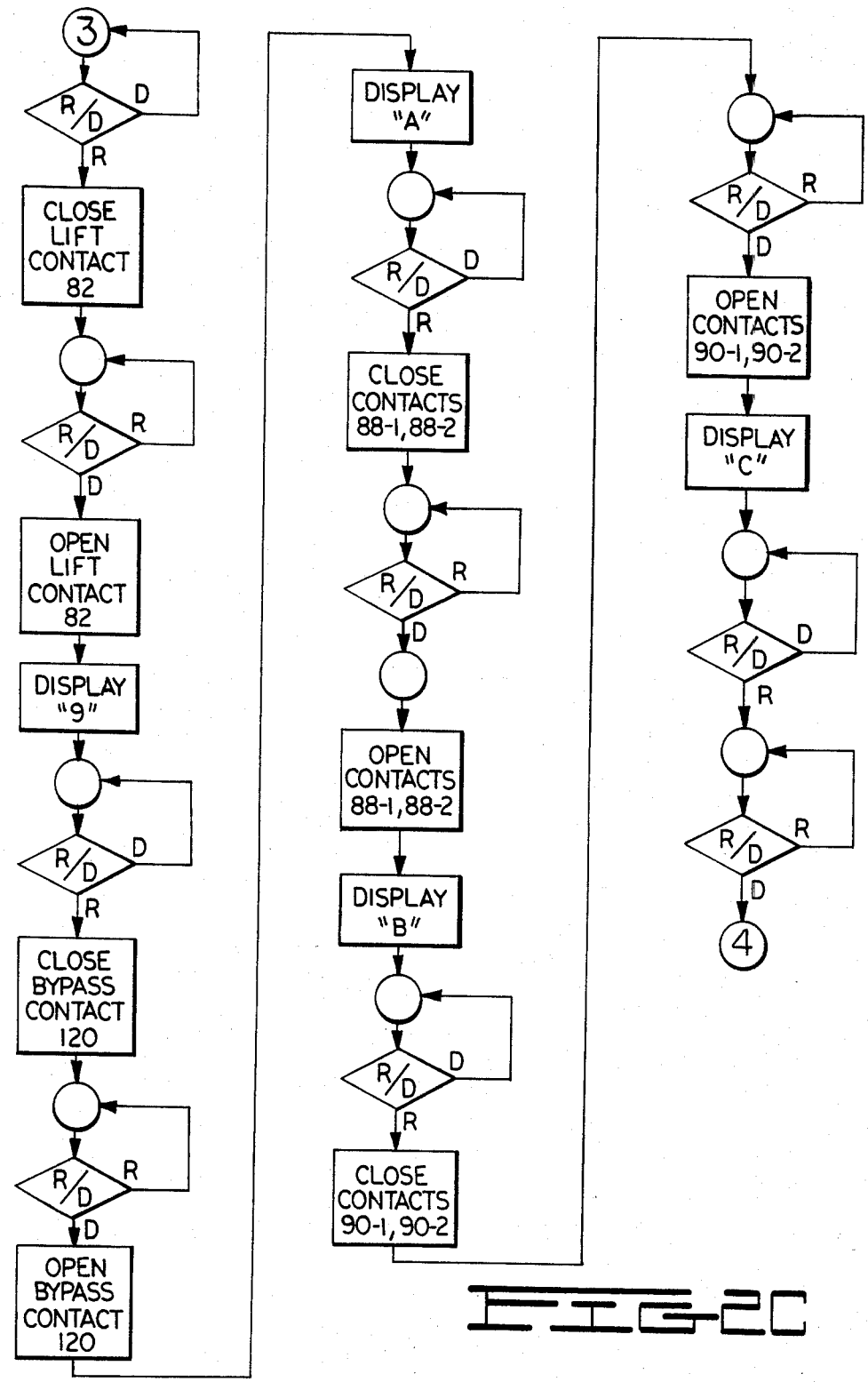

FIG. 2 is a simplified flowchart of a computer program suitable for controlling the means 128. Only an exemplary software routine sufficient to implement one embodiment of the present invention, for example the electric lift truck, is shown in FIG. 2. Sufficient detail is presented to allow one skilled in computer programming to implement the flowchart for any common microprocessor. The program of FIG. 2 was written to be run on the MOSTEK processor previously referred to.

Referring now to FIG. 2, assume that the key switch 36 is in the open position and the switch 62 is moved to the RUN position. In response to the switch 62 being in the RUN position, the presence of +Vbb is determined from the signal received by the means 16 from the means 124. If +Vbb is not present, the display 130 remains blank. However, if one of the digital signals is received on the lines 126, a number from 0 to 9 is displayed by the circuit 130. The displayed number represents the state of charge of the battery 32, with the number 9 representing a fully charged battery 32 and the number 0 representing a fully discharged battery 32. The numbers between 0 and 9 represent various intermediate states of charge of the battery 32.

The substantially continuous display of battery 32 voltage is interrupted by the means 128 in response to predetermined fault conditions of the apparatus 10 and a predetermined fault code is supplied to the device 130 by the means 128. For example, failure to detect pulsing on the line 122 during the time that pulse trains are being delivered to the means 108 via the line 114 indicates that the means 108 is shorted or that the bypass contact 120 is erroneously closed. In response to such a fault condition the means 16 opens the line contact 68 and safely disables the apparatus 10 and the means 128 also displays the character "F" on the device 130, alerting the operator to the cause of the failure. Other faults or conditions can be displayed, within the limits of the display device 130 used.

Assume now that the key switch 36 is open and that the switch 62 is moved to the DIAGNOSTIC position. In response to the key switch 36 being closed, the processor 20 enters the diagnostic mode, as is best shown in FIG. 2. The diagnostic mode is interactive and requires the attention of a mechanic or serviceman.

Basically, a series of tests are performed by the processor 20 according to the preprogrammed instructions in the software and the results of the tests are either displayed directly on the device 130 or are mechanically indicated. The results of each of the tests serve to guide the serviceman toward a logical resolution of a problem with the apparatus 10.

Prior to closing the switch 36, the drive fuse 98 is removed. Closing the switch 36 causes the first diagnostic code, the number "1", to be displayed by the circuit 130 in response to signals delivered to the circuit 130 from the processor 20. The number or code displayed indicates the test in progress and can be referred to in, for example, a service manual provided to the serviceman or in other descriptive material.

The first five diagnostic tests are of the command signal producing devices 12, as shown in FIG. 2. For each test the serviceman is required to operate, the respective device 12 and the processor 20 checks for the receipt of the predetermined command signals in the correct sequence. As each test is passed, the displayed diagnostic code is automatically incremented to the next sequential value, prompting the serviceman to perform the next manual operation. Failure of any one of the tests, i.e., failure to receive the predetermined command signal, inhibits the automatic incrementing and prompts the serviceman to take corrective action in the area of the failure.

In the electric vehicle example, the first test is of the seat switch 56. With the number "1" displayed on the circuit 130, the serviceman closes then opens the switch 56. In response to receiving the command signals on the line 58, the processor 20 causes the displayed number to be automatically incremented to a "2". Failure to receive the proper command signals on the line 58 inhibits the incrementing of the diagnostic code.

As shown by FIG. 2, successful completion of each test automatically increments the displayed code. Thus, for example, the code "2" requires that the direction switch 46 be moved from the neutral N position to the reverse R position and finally to the forward F position to cause the code to be incremented to a "3" which, in turn, requires that the lift switch be closed from the open position to cause incrementing to a "4".

The code "4" requires that the accelerator pedal be depressed once from the fully extended position to the fully depressed position. In response to detecting each of the 16 digital numbers on the lines 28 in the proper sequence, the displayed code is incremented to a "5" and the steer-wheel angle means 38 is checked in a similar manner.

Following the check of the means 38, the code is incremented to a "6" and the tests of the devices 12 are complete. The processor 20 next automatically checks the signal delivered by the transducer means 124 on the line 126. Failure of this test indicates that the means 124 is defective or that the battery 32 voltage is too low for proper apparatus 10 operation, and the displayed code remains a "6". If the received signal is proper, the code is incremented to a "7" and testing of the control signal receiving devices 14 proceeds.

At any time during the preceeding tests, the serviceman can override a faulty test condition. The means 60 is provided for manually incrementing the displayed code by moving the RUN/DIAGNOSTIC switch 62 from the DIAGNOSTIC position to the RUN position and back again. The override signal is received by the processor 20 on the line 64 and the code is incremented without successful completion of the test in question. This allows the serviceman to complete the test sequence despite the finding of a fault condition.

The devices 14 are tested by manually observing the response of each device 14 to respective signals delivered to the device 14 from the processor 20. The RUN/DIAGNOSTIC switch 62 is used by the serviceman to control the tests. For example, with a "7" being displayed by the circuit 130, the switch 62 is moved from the DIAGNOSTIC position to the RUN position. In response, the processor 20 delivers the signal on the line 70 to energize the coil 66 and close the line contact 68. After manually verifying that the contact 68 has closed, the serviceman moves the switch 62 back to the DIAGNOSTIC position and the processor 20 increments the displayed code to an "8". Failure of the contact 68 to close indicates a need for service to the contact 68 or its associated circuitry.

The next cycle of the switch 62 from DIAGNOSTIC to RUN and back to DIAGNOSTIC again cycles the lift contact 82 closed, then open in a manner similar to that of the contact 68, and increments the displayed code to a "9". The following cycle operates the bypass contact 120 in a similar manner and increments the code to the letter "A".

With an "A" being displayed, cycling the switch 62 causes the contacts 88-1,88-2 to close, then open and the displayed code to increment to a "B". One additional cycle of the switch 62 cycles the contacts 90-1,90-2 and increments the code to a "C".

The presence of the displayed "C" indicates the end of the diagnostic test procedure. Since the tests of the devices 14 cannot be directly verified by the means 128, it is imperative that the serviceman carefully observe the apparatus 10 for correct responses. One final cycle of the switch 62 resets the displayed code to an "8" and allows the tests of the devices 14 to be repeated as desired. Opening the key switch 36 and returning the switch 62 to the RUN position returns the operation of the apparatus 10 to the run mode as described above.

Of course, other diagnostic tests can be provided for in the software other than those described in the exemplary apparatus 10 without departing from the appended claims.

INDUSTRIAL APPLICABILITY

A diagnostic system made according to the present invention is ideally suited for inclusion in a modern electric vehicle or lift truck. The apparatus 10 utilizes components and circuits to perform the dual roles of vehicle control and diagnostics, thus achieving significant gains in efficiency and economy over systems lacking such design.

For example, the software programmable processor 20 functions to perform in-service diagnostics such as continuous monitoring and display of battery 32 condition and monitoring and display of various predetermined fault conditions of the apparatus 10, and substantially simultaneously functions to control all other normal operations of the vehicle. Additionally, selection of the DIAGNOSTIC mode causes the processor 20 to temporarily assume the role of an out-of-service diagnostic aid and to logically ascertain the condition of many key components of the apparatus 10.

In the normal operation of a vehicle including the apparatus 10, the RUN mode is selected and the operator uses the vehicle in a straight-forward fashion, without concern or even necessary knowledge of the sophisticated nature of the included invention. He is provided with an accurate and substantially continuous display of information, for example battery 32 voltage, but sees nothing of the continuous in-service diagnostic checking that occurs unless a fault develops. Should a fault develop, the displayed diagnostic code informs him of the nature of the problem and corrective action is taken.

During normal periodic maintenance of the vehicle, or when a disabling problem does occur, the serviceman is provided with a powerful diagnostic tool upon switching to the DIAGNOSTIC mode. In this mode he quickly and efficiently locates a faulty element in the apparatus 10 or isolates a problem in a specific portion of the apparatus 10. Little, if any, equipment external to the apparatus 10 is required for the performance of the out-of-service diagnostics, nor is a highly skilled serviceman necessary.

Thus, this invention utilizes modern electronic technology to simplify both in-service and out-of-service diagnostic testing and minimizes costs by requiring a minimum of equipment external to the system being tested.

Other aspects, objects, advantages, and uses of this invention can be obtained from a study of the drawings, the disclosure, and the appended claims.

We claim:

1. An electric vehicle diagnostic apparatus (10), comprising:
   a battery (32);
   transducer means (124) for producing a battery condition signal;
   a plurality of manually operable command signal producing devices (12), each adapted to produce respective input command signals;
   means (60) for producing first and second diagnostic command signals; and
   means (128) for receiving said plurality of input command signals, said battery condition signal, and said first and second diagnostic command signals, substantially continuously displaying a predetermined condition of said battery (32) in response to the condition of said battery (32) and to initially receiving a predetermined one of said first and second diagnostic command signals, displaying a predetermined diagnostic code in response to initially receiving the other of said first and second diagnostic command signals, and automatically incrementally sequencing said displayed code in response to receiving predetermined ones of said plurality of input command signals in a predetermined sequence or to cyclic operation of said diagnostic command signal producing means (60).

2. An electric vehicle diagnostic apparatus (10), as set forth in claim 1, wherein said means (128) includes a software programmable processor (20) and a digital display device (130).

3. An electric vehicle diagnostic apparatus (10), as set forth in claim 2, wherein said means (128) interrupts said continuous display in response to a predetermined fault condition of said apparatus (10) and supplies a predetermined fault code to said display device (130).

4. An electric vehicle diagnostic apparatus (10), as set forth in claim 1, wherein said displayed battery (32) condition is the state of charge of said battery (32).

5. A diagnostic apparatus for an electric vehicle, comprising:
   a plurality of manually controllable means for producing respective predetermined input command signals;
   manually operable switch means for producing first and second diagnostic command signals in response to being in respective first and second operating positions; and
   processor means for receiving said plurality of predetermined input command signals and said first and second diagnostic command signals;
   displaying a first one of a first set of predetermined diagnostic codes in response to initially receiving said second diagnostic command signal;
   controllably incrementing said first displayed diagnostic code and displaying successive ones of said first set of predetermined diagnostic codes, each in response to receiving a respective one of said predetermined input command signals in a predetermined sequence or to movement of said manual switch means from said second operating position to said first operating position and back to said second operating position; and
   controllably displaying a first one of a second set of predetermined diagnostic codes in response to receiving each of said predetermined input command signals in said predetermined sequence or to continued cyclic operation of said manual switch means, continuing to display said diagnostic code and producing a respective one of a plurality of predetermined output control signals in response to movement of said manual switch means from said second operating position to said first operating position, ceasing to produce said one of said predetermined output control signals and displaying a successive one of said second set of predetermined diagnostic codes in response to movement of said manual switch means from said first operating position to said second operating position, and continuing to sequentially display each of said second set of predetermined diagnostic codes and producing respective ones of said plurality of predetermined output control signals in response to continued cyclic operation of said manual switch means.

6. A diagnostic apparatus, as set forth in claim 5, wherein said processor means substantially continuously displays a predetermined operating condition of said vehicle in response to initially receiving said first diagnostic command signal.

7. A diagnostic apparatus, as set forth in claim 6, wherein said processor means again displays said first one of said second set of predetermined diagnostic codes in response to having sequentially displayed each of said second set of predetermined diagnostic codes and to one additional cyclic operation of said manual switch means.

8. A diagnostic apparatus, as set forth in claim 7, including a plurality of control signal receiving devices connected to said processor means, each of said control signal receiving devices being adapted to operatively respond to a predetermined one of said predetermined output control signals.

9. A diagnostic apparatus, as set forth in claim 5, including a battery;
   a transducer having an input terminal connected to said battery and an output terminal connected through said transducer to said processor means; and
   wherein said predetermined operating condition of said vehicle is responsive to a predetermined condition of said battery.

* * * * *